(12) United States Patent
Kobayashi et al.

(10) Patent No.: US 8,912,258 B2
(45) Date of Patent: Dec. 16, 2014

(54) POLYACETAL RESIN COMPOSITION

(75) Inventors: Daisuke Kobayashi, Mie (JP); Akira Ito, Mie (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 129 days.

(21) Appl. No.: 13/634,070

(22) PCT Filed: Mar. 11, 2011

(86) PCT No.: PCT/JP2011/055785
§ 371 (c)(1),
(2), (4) Date: Nov. 26, 2012

(87) PCT Pub. No.: WO2011/111823
PCT Pub. Date: Sep. 15, 2011

(65) Prior Publication Data
US 2013/0062550 A1 Mar. 14, 2013

(30) Foreign Application Priority Data
Mar. 12, 2010 (JP) ................. 2010-055414

(51) Int. Cl.
| | | |
|---|---|---|
| *C08K 5/34* | (2006.01) | |
| *C08K 5/3492* | (2006.01) | |
| *C08K 5/3435* | (2006.01) | |
| *C08K 3/10* | (2006.01) | |
| *C08K 5/13* | (2006.01) | |
| *C08L 59/02* | (2006.01) | |
| *C08K 3/22* | (2006.01) | |
| *C08L 79/04* | (2006.01) | |
| *C08L 77/00* | (2006.01) | |

(52) U.S. Cl.
CPC .............. *C08L 59/02* (2013.01); *C08L 79/04* (2013.01); *C08K 5/13* (2013.01); *C08L 77/00* (2013.01); *C08K 3/22* (2013.01); *C08K 5/34* (2013.01)
USPC ............ 524/100; 524/102; 524/291; 524/401

(58) Field of Classification Search
CPC .......... C08I 79/04; C08L 77/00; C08L 59/02; C08K 3/22; C08K 5/34; C08K 5/13
USPC .................. 524/100, 102, 401, 291
See application file for complete search history.

(56) References Cited

U.S. PATENT DOCUMENTS

| | | | |
|---|---|---|---|
| 5,948,844 A | * | 9/1999 | Oka et al. |
| 6,130,282 A | | 10/2000 | Imahashi et al. |
| 6,211,268 B1 | | 4/2001 | Matsumura et al. |
| 6,676,920 B1 | | 1/2004 | Oishi et al. |
| 7,060,246 B2 | | 6/2006 | Oishi et al. |

FOREIGN PATENT DOCUMENTS

| | | |
|---|---|---|
| AU | 733739 B2 | 4/1999 |
| CA | 2 320 133 A1 | 6/2000 |
| CA | 2 249 174 C | 4/2006 |
| CA | 2 647 989 A1 | 10/2007 |
| CN | 1297423 A | 5/2001 |
| CN | 1572726 A | 2/2005 |
| CN | 101415642 A | 4/2009 |
| DE | 699 03 370 T2 | 7/2003 |
| DE | 699 35 666 T2 | 12/2007 |
| DE | 698 38 659 T2 | 8/2008 |
| EP | 0 906 933 A1 | 7/1999 |
| EP | 0 957 128 A2 | 11/1999 |
| EP | 1 063 199 A1 | 12/2000 |
| EP | 2 001 800 | 12/2008 |
| ES | 2 284 278 T3 | 11/2007 |
| ES | 2 296 323 T3 | 4/2008 |
| JP | 52-59643 A | 5/1977 |
| JP | 8-325430 A | 12/1996 |
| JP | 10-204298 A | 8/1998 |
| JP | 11-181305 A | 7/1999 |
| JP | 11-323078 A | 11/1999 |
| JP | 2000-233924 A | 8/2000 |
| JP | 2001-354832 A | 12/2001 |
| JP | 3296986 B2 | 7/2002 |
| JP | 2005-200300 A | 7/2005 |
| JP | 2005-306995 A | 11/2005 |
| JP | 2006-160603 A | 6/2006 |
| JP | 2009-532315 A | 9/2009 |
| NO | 20004068 L | 10/2000 |
| RU | 2008 143 217 A | 5/2010 |
| TW | 506991 B | 10/2002 |
| WO | 00/35808 A1 | 6/2000 |
| WO | 2007049090 A1 | 5/2007 |
| WO | 2007/117841 A2 | 10/2007 |
| WO | 2007117840 A2 | 10/2007 |
| WO | WO 2007117841 A2 * | 10/2007 |

OTHER PUBLICATIONS

International Search Report for PCT/JP2011/055785 dated Jun. 21, 2011.
European Search Report issued Jan. 3, 2014 in European Patent Application No. 11753481.8.
Japanese Office Action issued Sep. 24, 2014 in Japanese Patent Application No. 2012-504538.

* cited by examiner

*Primary Examiner* — Kriellion Sanders
(74) *Attorney, Agent, or Firm* — Sughrue Mion, PLLC

(57) ABSTRACT

A polyacetal resin composition obtained by compounding 0.01 to 10.0 parts by weight of sterically hindered phenol (B) and 0.001 to 5 parts by weight of magnesium hydroxide (C) having a BET specific surface area of 20 m²/g or lower and an average particle diameter of 2 μm or less relative to 100 parts by weight of a polyacetal resin (A).

10 Claims, 1 Drawing Sheet

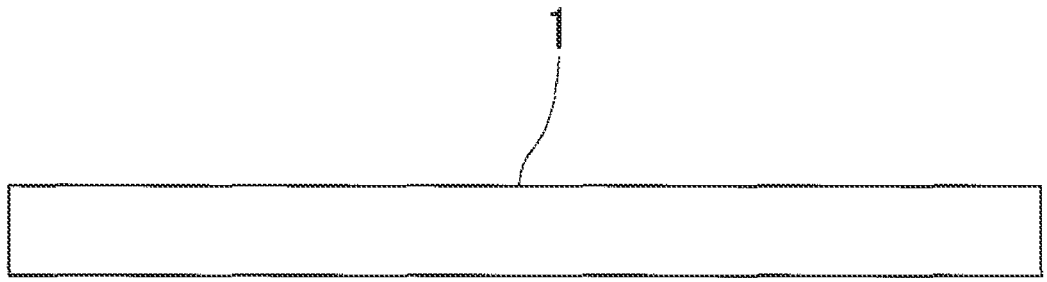

POLYACETAL RESIN COMPOSITION

CROSS REFERENCE TO RELATED APPLICATIONS

This application is a National Stage of International Application No. PCT/JP2011/055785 filed Mar. 11, 2011, claiming priority based on Japanese Patent Application No. 2010-055414 filed Mar. 12, 2010, the contents of all of which are incorporated herein by reference in their entirety.

TECHNICAL FIELD

The present invention relates to a polyacetal resin composition having superior impact resistance and heat resistance.

BACKGROUND ART

Polyacetal resins are excellent in balance among mechanical properties, thermal properties, electrical properties, sliding properties, moldability and the like and therefore are widely used as structural materials and mechanism elements for electric instruments, automobile parts, precision machinery components and the like. However, they may be sometimes insufficient in mechanical properties such as impact resistance and the like or in heat resistance and may often require further improvements in these properties according to applications.

Conventionally, a polyoxymethylene resin composition is disclosed in which magnesium hydroxide is compounded to a polyoxymethylene resin composition in order to improve heat resistance (see Patent Document 1).

PRIOR ART DOCUMENT

Patent Document

Japanese Patent Application Laid-open No. H11-323078

DISCLOSURE OF THE INVENTION

Problem to be Solved by the Invention

However, there is still room for improvement in the polyoxymethylene resin composition disclosed in the above Patent Document 1 for its impact resistance and heat resistance.

The present invention has been made in order to solve the above problem and an object of the present invention is to provide a polyacetal resin composition having superior impact resistance and heat resistance.

Means for Solving the Problem

In order to solve the above problem, the present inventors have carried out an extensive study with focusing on the average particle diameter and BET specific surface of magnesium hydroxide, and as a result they found that the above problem can be solved with a polyacetal resin composition which comprises sterically hindered phenol in a specific proportion relative to a polyacetal resin and is obtained by compounding magnesium hydroxide having a specific average particle diameter and BET specific surface area in a specific proportion, thereby completing the present invention.

Thus, the present invention is a polyacetal resin composition obtained by compounding 0.01 to 10.0 parts by weight of sterically hindered phenol (B) and 0.001 to 5 parts by weight of magnesium hydroxide (C) having a BET specific surface area of 20 $m^2/g$ or lower and an average particle diameter of 2 μm or less relative to 100 parts by weight of a polyacetal resin (A).

According to the present invention, since the magnesium hydroxide (C) having a BET specific surface area of 20 $m^2/g$ or lower and an average particle diameter of 2 μm or less is used, the polyacetal resin composition having superior impact resistance and heat resistance can be provided.

Effect of the Invention

The polyacetal resin composition of the present invention has significantly improved impact resistance and heat resistance. The polyacetal resin composition of the present invention, due to such superior properties, can be preferably used for automobile interior parts, interior parts for residential buildings or the like (hot water mixing valves etc.), parts for clothing materials (fasteners, belt buckles etc.), building material applications (pipes, pump parts etc.), electrical parts (gears etc.), fuel parts and the like.

BRIEF DESCRIPTION OF THE DRAWING

FIG. 1 is a side view showing an example of the molded article according to the present invention.

EMBODIMENT FOR CARRYING OUT THE INVENTION

The polyacetal resin (A) in the present invention is a polymer having repeating units of an acetal structure —(—O—CRH—)$_n$— (wherein R represents a hydrogen atom or an organic group), and usually its main structural unit is an oxymethylene group (—$CH_2$O—), namely R is a hydrogen atom. The polyacetal resin used for the present invention may comprise, in addition to acetal homopolymers solely consisting of this repeating structure, copolymers (block copolymers) and terpolymers which comprise one or more repeating structural unit other than the oxymethylene group and may have not only the linear structure but also branched and cross-linked structures. The structural unit other than the oxymethylene group may include oxyalkylene groups which have 2 or more and 10 or less carbon atoms and may be branched, such as an oxyethylene group (—$CH_2CH_2$O—), an oxypropylene group (—$CH_2CH_2CH_2$O—), an oxybutylene group (—$CH_2CH_2CH_2CH_2$O—) and the like. Among these, oxyalkylene groups which have 2 or more and 4 or less carbon atoms and may be branched are preferred, and an oxyethylene group is particularly preferred. The amount contained of the oxyalkylene structural unit other than the oxymethylene group in the polyacetal resin is preferably 0.1% by weight or more and 20% by weight or less, more preferably 0.5% by weight or more and 15% by weight or less.

The production method of the polyacetal resin in the present invention is arbitrary. Namely, the polyacetal resin may be prepared by any conventionally well-known methods. For example, the polyacetal resin whose structural units are the oxymethylene group and the oxyalkylene group having 2 or more and 4 or less carbon atoms can be produced by copolymerizing a cyclic acetal of the oxymethylene group such as trimers (trioxanes) or tetramers (tetraoxanes) of formaldehyde and a cyclic acetal containing the oxyalkylene group having 2 or more and 4 or less carbon atoms such as ethylene oxide, 1,3-dioxolane, 1,3,6-trioxocane, 1,3-dioxepane and the like. Among these, the polyacetal resin used for the present invention is preferably a copolymer of a cyclic acetal such as trioxanes, tetraoxanes and the like and ethylene oxide or 1,3-dioxolane, and is particularly preferably a copolymer of a trioxane and 1,3-dioxolane.

The sterically hindered phenol (B) in the present invention may include triethylene glycol-bis-3-(3-t-butyl-4-hydroxy-5-methylphenyl)propionate, pentaerythrityl-tetrakis-3-(3,5-di-t-butyl-4-hydroxyphenyl)propionate and 1,6-hexanediol-bis[3-(3,5-di-t-butyl-4-hydroxyphenyl)propionate] and the like. The amount compounded of the sterically hindered phenol (B) is, relative to 100 parts by weight of the polyacetal resin, from 0.01 to 10.0 parts by weight, preferably from 0.01 to 2.0 parts by weight, and particularly preferably from 0.02 to 1.0 part by weight. When the amount compounded of the sterically hindered phenol (B) is less than 0.01 parts by weight relative to 100 parts by weight of the polyacetal resin, sufficient stabilization effect is not obtained. It is unfavorable that the amount compounded of the sterically hindered phenol (B) is more than 10.0 parts by weight relative to 100 parts by weight of the polyacetal resin because gas production during molding or poor appearance of molded products may occur.

The magnesium hydroxide (C) in has a BET specific surface area of 20 $m^2/g$ or lower and an average particle diameter of 2 μm or less. Preferably, the BET specific surface area is 10 $m^2/g$ or lower and the average particle diameter is 1.5 μm or less. When the BET specific surface area of magnesium hydroxide exceeds 20 $m^2/g$ and the average diameter of magnesium hydroxide exceeds 2 μm, heat resistance and impact resistance are significantly decreased. The magnesium hydroxide in the present invention may be used with it untreated, but it is preferable to use the one which has been surface treated with fatty acids, fatty acid metal salts, silane coupling agents, titanate coupling agents and the like.

The fatty acid and fatty acid metal salt are represented by RCOOH and M(OOCR)n, respectively, wherein R is an alkyl or alkene group, M is a group IA, IIB or IIIA metal and n is a positive integer. The group IA metal may include, for example, lithium, sodium, potassium, rubidium and the like. The group IIB metal may include zinc, cadmium and the like. The group IIIA metal may include scandium, yttrium and the like.

The fatty acid may specifically include higher fatty acids having 10 or more carbon atoms such as stearic acid, erucic acid, palmitic acid, lauric acid, behenic acid and the like.

The fatty acid metal salt may specifically include alkali metal salts of the above-mentioned higher fatty acids.

The silane coupling agent may include vinyl triethoxy silane, vinyl tris(β-methoxyethoxy)silane and the like.

The titanate coupling agent may include isopropyl-tri(dioctylphosphate)titanate, titanium di(octylphosphate)oxyacetate and the like.

The amount compounded of the magnesium hydroxide (C) is, relative to 100 parts by weight of the polyacetal resin, from 0.001 to 5.0 parts by weight, preferably from 0.005 to 3.0 parts by weight and particularly preferably from 0.01 to 2.0 parts by weight. When the amount compounded of the magnesium hydroxide (C) is less than 0.001 parts by weight, heat resistance is decreased and when it is more than 5.0 parts by weight, impact resistance and heat resistance are decreased.

A nitrogen-containing compound (D) in the present invention may include amino-substituted triazine compounds, polyamide resins, hindered amine-based light stabilizers and the like. The amount compounded of the nitrogen-containing compound (D) is, relative to 100 parts by weight of the polyacetal resin, preferably from 0.01 to 5.0 parts by weight, more preferably from 0.01 to 3.0 parts by weight, and particularly preferably from 0.02 to 2.0 parts by weight. When the amount compounded of the nitrogen-containing compound (D) is within the above range relative to 100 parts by weight of the polyacetal resin, there is an advantage that an effect as a stabilizer is higher compared to the case when the amount compounded of the nitrogen-containing compound (D) is beyond the above range.

The amino-substituted triazine compound may include guanamine, melamine, N-butylmelamine, N-phenylmelamine, N,N-diphenylmelamine, N,N-diallylmelamine, N,N',N"-triphenylmelamine, N,N',N"-trimethylolmelamine, benzoguanamine, water-soluble melamine-formaldehyde resins, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, ammeline (N,N,N',N'-tetracyanoethylbenzoguanamine) and the like. Among these, melamine, N,N',N"-trimethylolmelamine, benzoguamanime and water-soluble melamine-formaldehyde resins are preferred.

The polyamide resin may include Nylon-6, Nylon-6,6, Nylon-6,10 and terpolymers thereof (6·6/6·10/6), polymeric fatty acid-based polyamide resins and polyamide elastomers. Among these, polymeric fatty acid-based polyamide resins and polyamide elastomers are preferred. The polymeric fatty acid-based polyamide resins refer to polyamide resins synthesized from a polymeric fatty acid and a diamine. The polymeric fatty acid refers to dimers and the like of unsaturated fatty acids etc. such as oleic acid, linoleic acid and the like.

The hindered amine-based light stabilizer may include N,N',N",N"'-tetrakis-(4,6-bis-(butyl-(N-methyl-2,2,6,6-tetramethylpiperidin-4-yl)amino)-triazin-2-yl)-4,7-diazadecan-1,10-diamine, polycondensation products of dibutylamine, 1,3,5-triazine, N,N'-bis(2,2,6,6-tetramethyl-4-piperidyl-1,6-hexamethylenediamine and N-(2,2,6,6-tetramethyl-4-piperidyl)butylamine, poly[{6-(1,1,3,3-tetramethylbutyl)amino-1,3,5-triazin-2,4-diyl}{(2,2,6,6-tetramethyl-4-piperidyl}imino)hexamethylene{(2,2,6,6-tetramethyl-4-piperidyl)imino}], polymeric products of dimethyl succinate and 4-hydroxy-2,2,6,6-tetramethyl-1-piperidine ethanol, bis(1,2,2,6,6-pentamethyl-4-piperidyl) [[3,5-bis(1,1-dimethylethyl)-4-hydroxyphenyl]methyl]butylmalonate, bis(2,2,6,6-tetramethyl-4-piperidyl)sebacate and bis(1,2,2,6,6-pentamethyl-4-piperidyl)sebacate, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. Among these, bis (2,2,6,6-tetramethyl-4-piperidyl)sebacate and bis (1,2,2,6,6-pentamethyl-4-piperidyl)sebacate are preferred.

Polyethylene glycol (E) in the present invention is obtained by ring-opening polymerization of ethylene oxide, and may be the one having hydroxyl groups at terminals and having the number average molecular weight of 10,000 or more, preferably in the range of from 10,000 to 30,000. The polyethylene glycol in the present invention may be liner or branched. The amount compounded of the polyethylene glycol (E) in the present invention is, relative to 100 parts by weight of the polyacetal resin, preferably from 0.01 to 5.0 parts by weight, more preferably from 0.01 to 3 parts by weight, and particularly preferably from 0.02 to 2.0 parts by weight.

The polyacetal resin composition according to the present invention, when the present invention is carried out, may comprise various types of antioxidants, light stabilizers, ultraviolet absorbing agents, lubricants, nucleating agents, fillers, pigments, surfactants, antistatic agents and the like in a range which does not impair the original purpose.

The molded article according to the present invention can be obtained by molding the polyacetal resin composition of the present invention according to well-known molding processes of polyacetal resins. The molded article 1 formed by the polyacetal resin composition of the present invention may be in the form of a sheet as shown in FIG. 1, for example; however it is not limited to a sheet and may be various products known as applications for polyacetal resins like materials such as pellets, round bars and thick plates, tubes, various containers, other various parts for machines, electrics, automobiles and building materials.

EXAMPLES

The present invention is now illustrated more specifically by way of examples; however, the present invention is not limited to these examples.

Resin compositions obtained in examples and comparative examples were evaluated by the following evaluation methods.

<Drop Impact Test>

A disc having the dimensions of φ100 mm×4 mm thickness was formed from the resin composition obtained in example or comparative example using IS90B (manufactured by Toshiba Machine Co., Ltd.). Fracture energy upon application of impact energy of 100 J to the disc was measured with the Fractvis tester (manufactured by CEAST). The higher impact resistance becomes, the higher fracture energy becomes.

<Thermogravity Reduction Fate>

This indicates the reduction rate of the weight of the resin compositions obtained in examples or comparative examples placed in a test tube and heated under reduced pressure of 10 Torr at 240° C. for an hour after nitrogen substitution. The higher heat stability becomes, i.e. the higher heat resistance becomes, the smaller thermogravity reduction rate becomes.

The resin composition fulfilling the following acceptability criteria was considered as acceptable and other compositions were considered as unacceptable.

Acceptability criterion for impact resistance: fracture energy of 10 J or higher; and Acceptability criterion for heat resistance: thermogravity reduction rate of 2.5 wt % or lower.

The average particle diameter of magnesium hydroxide in the present invention was measured by laser diffractometry after suspending magnesium hydroxide in ethanol and subjecting to ultrasonic treatment for 3 minutes. The BET specific surface area was measured by the N2 adsorption method.

Examples 1 to 16 and Comparative Examples 1 to 5

Iupital A20-03 (trade name) in which the sterically hindered phenol (B) was compounded at the proportion indicated in Tables 1 and 2 relative to 100 parts by weight of the polyacetal resin (A) was prepared. Polyacetal resin compositions were obtained by compounding magnesium hydroxide (C), the nitrogen-containing compound (D) and polyethylene glycol (E) at the proportions indicated in Tables 1 and 2 relative to 100 parts by weight of Iupital A20-03. The polyacetal resin compositions were melted while heating at a temperature in the range of 210 to 230° C. and devolatilized under reduced pressure of 21.3 kPa using a biaxial extruder to prepare pellets. The properties of the obtained pellets were evaluated by the above-mentioned evaluation methods.

Symbols in Tables 1 and 2 represent the followings.

B-1: IRGANOX245 (manufactured by Ciba Japan, K.K.)

C-1: Magnesium hydroxide (average particle diameter: 1.1 μm and BET specific surface area: 5.2 m$^2$/g)

C-2: Magnesium hydroxide (average particle diameter: 1.3 μm and BET specific surface area: 4.4 m$^2$/g)

C-3: Magnesium hydroxide (average particle diameter: 0.9 μm and BET specific surface area: 5.1 m$^2$/g)

C-4: Magnesium hydroxide (average particle diameter: 1.0 μm and BET specific surface area: 5.2 m$^2$/g)

C-5: Magnesium hydroxide (average particle diameter: 5 μm and BET specific surface area: 51 m$^2$/g)

C-6: Magnesium hydroxide (average particle diameter: 3.5 μm and BET specific surface area: 35 m$^2$/g)

D-1: Melamine (manufactured by Mitsui Chemicals, Inc.)

D-2: Polymeric fatty acid-based polyamide resin PA-100 (Fuji Kasei Kogyo, Co., Ltd.)

D-3: Amino group terminal-containing polymeric fatty acid-based polyamide resin TXM-78C (Fuji Kasei Kogyo, Co., Ltd.)

D-4: Polyamide 12 elastomer 9040X1 (manufactured by Ube Industries, Ltd.)

D-5: TINUVIN 770 (manufactured by Ciba Japan, K.K.)

E-1: PEG-20000P (manufactured by Sanyo Chemical Industries, Ltd.)

TABLE 1

| | Sterically hindered phenol (B) [phr] | Magnesium hydroxide (C) [phr] | Nitrogen-containing compound (D) [phr] | Polyethylene glycol (E) [phr] | Fracture energy [J] | Thermogravity reduction rate [wt %] |
|---|---|---|---|---|---|---|
| Ex. 1 | B-1 0.3 | C-1 0.05 | | | 24 | 0.8 |
| Ex. 2 | B-1 0.3 | C-1 0.5 | | | 17 | 2.4 |
| Ex. 3 | B-1 0.3 | C-1 1.0 | | | 13 | 2.5 |
| Ex. 4 | B-1 0.3 | C-2 0.05 | | | 22 | 0.7 |
| Ex. 5 | B-1 0.3 | C-3 0.05 | | | 20 | 0.7 |
| Ex. 6 | B-1 0.3 | C-4 0.05 | | | 22 | 0.8 |
| Ex. 7 | B-1 0.3 | C-1 1.0 | D-1 0.5 | | 13 | 2.2 |
| Ex. 8 | B-1 0.3 | C-1 1.0 | D-2 0.5 | | 15 | 1.2 |
| Ex. 9 | B-1 0.3 | C-1 1.0 | D-3 0.5 | | 14 | 0.8 |
| Ex. 10 | B-1 0.3 | C-1 1.0 | D-4 0.5 | | 12 | 1.4 |
| Ex. 11 | B-1 0.3 | C-1 1.0 | D-5 0.5 | | 10 | 2.2 |
| Ex. 12 | B-1 0.3 | C-1 1.0 | | E-1 0.5 | 27 | 0.8 |
| Ex. 13 | B-1 0.3 | C-1 1.0 | | E-1 1.0 | 30 | 0.9 |
| Ex. 14 | B-1 0.3 | C-1 1.0 | D-2 0.5 | E-1 1.0 | 34 | 1.1 |
| Ex. 15 | B-1 0.3 | C-1 1.0 | D-3 0.5 | E-1 1.0 | 31 | 0.8 |
| Ex. 16 | B-1 0.3 | C-1 1.0 | D-4 0.5 | E-1 1.0 | 33 | 1.3 |

TABLE 2

| | Sterically hindered phenol (B) [phr] | Magnesium hydroxide (C) [phr] | Nitrogen-containing compound (D) [phr] | Polyethylene glycol (E) [phr] | Fracture energy [J] | Thermogravity reduction rate [wt %] |
|---|---|---|---|---|---|---|
| Comp. ex. 1 | B-1 0.3 | C-5 0.05 | | | 8 | 1.2 |
| Comp. ex. 2 | B-1 0.3 | C-5 0.5 | | | 6 | 4.4 |
| Comp. ex. 3 | B-1 0.3 | C-5 1.0 | | | 4 | 5.0 |
| Comp. ex. 4 | B-1 0.3 | C-6 0.05 | | | 9 | 1.0 |
| Comp. ex. 5 | B-1 0.3 | C-5 1.0 | D-4 0.5 | E-1 1.0 | 16 | 2.6 |

The invention claimed is:

1. A polyacetal resin composition obtained by compounding 0.01 to 10.0 parts by weight of sterically hindered phenol (B) and 0.001 to 5 parts by weight of magnesium hydroxide (C) having a BET specific surface area of 20 m²/g or lower and an average particle diameter of 2 μm or less relative to 100 parts by weight of a polyacetal resin (A).

2. The polyacetal resin composition according to claim 1, wherein the magnesium hydroxide (C) is surface treated with at least one species selected from fatty acids, fatty acid metal salts, silane coupling agents and titanate coupling agents.

3. The polyacetal resin composition according to claim 1, obtained by further compounding 0.01 to 5.0 parts by weight of a nitrogen-containing compound (D) and/or 0.01 to 5 parts by weight of polyethylene glycol (E).

4. The polyacetal resin composition according to claim 3, wherein the nitrogen-containing compound (D) is at least one species selected from amino-substituted triazine compounds, polyamide resins and hindered amine-based light stabilizers.

5. The polyacetal resin composition according to claim 3, wherein the number average molecular weight of the polyethylene glycol (E) is from 10,000 to 30,000.

6. The polyacetal resin composition according to claim 4, wherein the amino-substituted triazine compound is at least one species selected from melamine, N,N',N"-trimethylolmelamine, benzoguanamine and water-soluble melamine-formaldehyde resins.

7. The polyacetal resin composition according to claim 4, wherein the polyamide resin is a polymeric fatty acid-based polyamide resin and/or a polyamide elastomer.

8. The polyacetal resin composition according to claim 4, wherein the hindered amine-based light stabilizer is at least one species selected from bis(2,2,6,6-tetramethyl-4-piperidyl)sebacate and bis(1,2,2,6,6-pentamethyl-4-piperidyl)sebacate.

9. A molded article formed by the polyacetal resin composition according to claim 1.

10. The polyacetal resin composition according to claim 1, wherein the polyacetal resin composition is obtained by compounding 0.01 to 10.0 parts by weight of the sterically hindered phenol (B) and 0.005 to 3.0 parts by weight of the magnesium hydroxide (C).

* * * * *